United States Patent [19]

Scheetz

[11] 4,220,036
[45] Sep. 2, 1980

[54] HEAVY WIRE BENDING TOOL

[76] Inventor: John L. Scheetz, 365 Maxwell Ave., Oakdale, Calif. 95361

[21] Appl. No.: 927,122

[22] Filed: Jul. 21, 1978

[51] Int. Cl.² ............................................. B21D 7/00
[52] U.S. Cl. ..................................................... 72/458
[58] Field of Search ................. 72/458, 457, 704, 705, 72/304, 308, 316

[56] References Cited

U.S. PATENT DOCUMENTS

| D. 203,948 | 3/1966 | Alexander | 72/458 |
| 2,464,002 | 3/1949 | Snyder | 72/458 |
| 2,674,142 | 4/1954 | Angelo | 72/458 |
| 3,777,542 | 12/1973 | Foshee | 72/457 |

Primary Examiner—Ervin M. Combs
Assistant Examiner—Gene P. Crosby
Attorney, Agent, or Firm—J. L. Bohan

[57] ABSTRACT

A hand tool for use by an electrician for bending heavy wire and service entrance cable for the purpose of facilitating the hookup of such wire and cable in service entrance switches, fuse panels, meter sockets and the like.

2 Claims, 3 Drawing Figures

HEAVY WIRE BENDING TOOL

BACKGROUND OF THE INVENTION

Service entrance cable for the modern home typically contains three lead wires which extend from the entrance head to the meter socket and thence to the entrance switch normally contained in a protected area typically within the house or garage. Modern codes frequently require 150 to 200 ampere service and sometimes greater for a newly constructed home or building. As as result, the three lead wires contained in the service entrance cable have increased in diameter over the years to the point where they are frequently ¾ to an inch in diameter. Such heavy wire is difficult to bend and frequently the building codes require that the entrance switch be located within a short distance such as one foot of where the cable passes through the wall, thereby giving very little working room in which to allow for bending of the wire. Usually a double bend is required, first where the wire emerges from the wall and then again where the wire enters into the knockout hole in the upper surface of the steel box construction of the service entrance switch. Moreover, once the entrance cable wires are within the service entrance switch, the wires must be bent so as to permit their connection to the terminals and neutral bar. In view of the heavy guage of the wire, such bending is difficult to accomplish by hand and electricians frequently resort to various devices such as pliers, wrenches and the like for the purpose of bending the cable as required. Unfortunately the sharp edges on these tools frequently lead to damage and occasionally puncture of the insulation surrounding the wire.

The bending tool of the present invention allows the electrician to bend the service entrance cable as required for installation in the service head, the meter socket and for connection to the service entrance switch. The lead wires contained within the cable can likewise be bent by the bending tool so as to facilitate their connection to the terminals.

SUMMARY OF THE INVENTION

The electrician's hand tool of the present invention is designed to permit the bending of cable and wire in close spaces with comparative ease without damaging the electrical properties of the insulation or other protective coatings on the outer surface of the wire or cable. The hand tool utilizes a lever function and a comparatively long handle to allow significant mechanical advantage, thereby greatly facilitating and easing the task of service entrance hookup. The tool features an upper "C" shaped member and a lower "U" shaped member which are axially set apart by vertical spacer members, the said members in turn being connected to an elongated handle to provide the mechanical leverage. The wire is simply cradled in the "C" and "U" shaped portions and leverage is applied downward on the handle so as to effect the desired bending of the wire or cable.

DRAWINGS OF THE PREFERRED EMBODIMENT

DESCRIPTION OF THE PREFERRED EMBODIMENT

Figure 1:
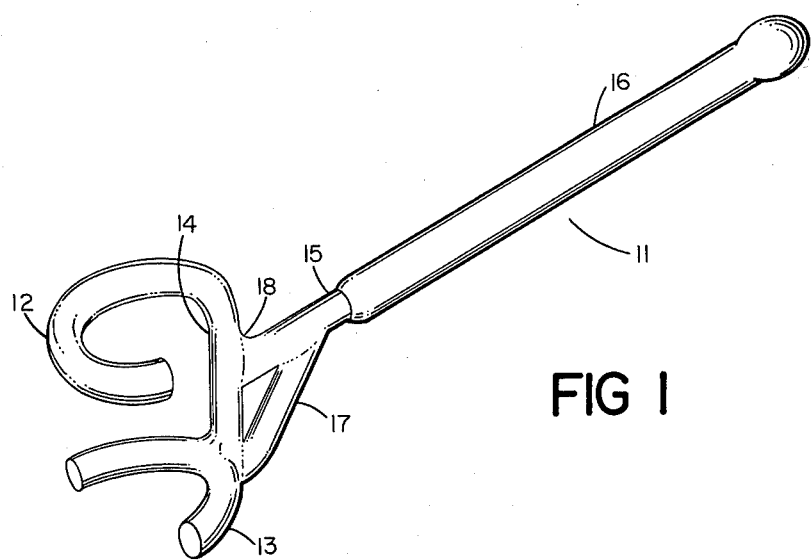
FIG. 1 is a perspective view of the electrician's hand tool of the present invention.

Referring to FIG. 1 the wire bending tool 11 is comprised of a "C" shaped upper member 12 and a "U" shaped lower member 13 connected by vertical spacer member 14. Connected to the rear side of the vertical spacer member 14 is a handle shaft 15 affixed thereto at an appropriate angle. Usually a perpendicular or rightangle attachment is adequate for most applications. The handle is preferably provided with a heavy duty insulated material 16 for the sake of safety and comfort. Strengthening bracket 17 is usually preferred in order to provide added strength and relieve pressure at juncture 18 between members 14 and 15.

Figure 2:
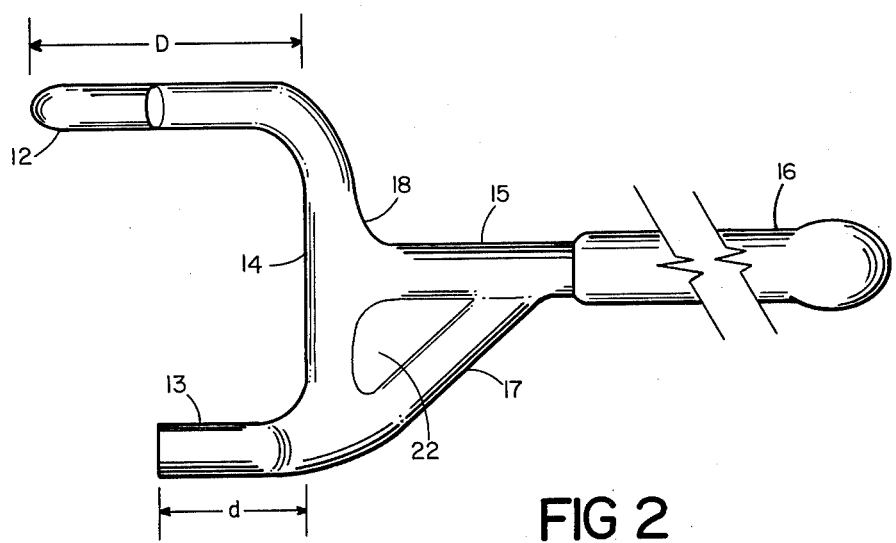
FIG. 2 is a side view of the hand tool of the present invention.

As shown in FIG. 2 the arms of the "U" shaped member 13 extend forward for a short distance, usually for a distance somewhat shorter than the distance extended by the "C" shaped member. This shorter distance of the lower member 13 is shown as "d" in FIG. 2, whereas the greater distance of the "C" shaped member is depicted by the distance D. Although this aspect of the invention with respect to the relative distances of these members is not critical, it is usually preferred that d be less than D to facilitate the use of the tool in tight places. The strengthening member 17 can extend from the lower portion to the handle as shown in FIG. 2, or, alternatively, it could extend from the upper portion or both. In FIG. 2 a hollowed area 22 is shown, however, this area could be filled in with material by welding or other appropriate means to as to further strengthen the unit.

Figure 3:
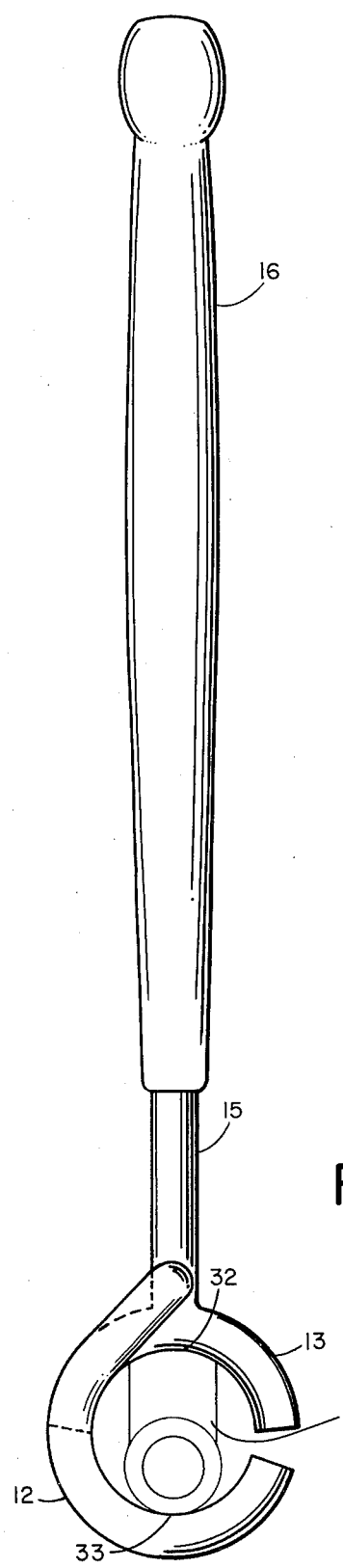
FIG. 3 is a top or plan view of the device of the present invention.

In FIG. 3 the heavy wire member 31 is shown positioned in the device with force about to be applied so as to bend the wire 31. The lower portion of the wire is in contact with the "U" shaped member 13 along the rearward inside surface thereof. The upper portion of the wire is in contact with the "C" shaped member 12 at point 33 along the forward inside surface thereof. By placing a downward force on handle 16, force is applied along the rearward inside surface of "U" shaped member 13 against wire 31, causing it to move forward. At the same instant the upper portion of the wire is caused to move backward by virtue of the force being applied at point 33 by the forward inside surface of member 12. By moving the handle 16 over sufficient arc to bring about plastic deformation of the wire 31, the wire will upon release of the force take a permanent set in accordance with the desire of the operator.

The preferred construction of the device of the present invention is of a heat treatable, rod-stock steel. An excellent type of wire is a spring steel wire such as that used in hay rake hoops. The insulation material 16 can be made up of any appropriate insulation material similar to that used for insulating wire. The exposed steel members which come into contact with the wire can be coated with appropriate materials so as to further minimize the possibility of tearing or cutting of the wire coating. For example, it could be coated with a suitable rubber material or painted with an appropriate plastic material.

It is obvious that various modifications may be made of the present device without departing from the spirit thereof. For example, the various components need not be made from cylindrical bar-stock but could be made from hexagonal, square or other type. Moreover, the unit shown herein is basically fabricated by welding techniques but there is no reason why it could not be formed by casting or machining. Accordingly, it will be obvious to those skilled in the art that various changes and modifications may be made therein without departing from the invention.

I claim:

1. A hand tool for bending heavy electric cable comprising:

a lower member in a first plane having a closed rearward portion and portions extending forwardly so as to define a first partially enclosed area with the rearward region closed and the forward region open;

an upper member in a second plane spaced apart from and generally parallel to said first plane, said upper member commencing at a rearward portion and extending forwardly and laterally so as to define a second partially enclosed area in substantial alignment with said first partially enclosed area said second partially enclosed area being partially open in the rearward region and substantially closed in the forward region for holding said heavy cable extending between first and second enclosed areas;

a spacing member interconnected with the rearward portion of said lower member and extending to and interconnected with the rearward portion of said upper member; said upper, lower and spacing member being comprised of a material cylindrical in cross-section; and a hand-holdable handle member extending rearwardly from and substantially perpendicular to said spacing member so as to apply mechanical advantage to said interconnected members to cause the rotation thereof in a plane substantially vertical to the aforesaid first and second planes whereby said upper and lower members engage the heavy cable causing it to bend without damage to electrical properties of insulation of wire.

2. A hand tool as in claim 1 wherein the material is heat-treatable steel.

* * * * *